United States Patent [19]

Derelanko

[11] Patent Number: 5,676,443
[45] Date of Patent: Oct. 14, 1997

[54] TRANSPARENCY PRESENTATION ORGANIZER FOR OVERHEAD PROJECTORS

[76] Inventor: Michael J. Derelanko, 117 Robertsville Rd., Manalapan, N.J. 07726

[21] Appl. No.: 767,781

[22] Filed: Dec. 17, 1996

[51] Int. Cl.⁶ ................................................. G03B 21/00
[52] U.S. Cl. ................................. 353/120; 40/701; 40/721
[58] Field of Search ........................... 353/120, DIG. 3, 353/DIG. 5; 40/701, 710, 721

[56] References Cited

U.S. PATENT DOCUMENTS

| | | | |
|---|---|---|---|
| 3,642,359 | 2/1972 | Kitch | 353/DIG. 5 |
| 4,203,659 | 5/1980 | Constantine et al. | 353/DIG. 5 |
| 4,679,923 | 7/1987 | Nielsen | 353/120 |
| 4,715,705 | 12/1987 | Nord | 353/120 |
| 4,787,738 | 11/1988 | Joffe | 353/DIG. 5 |
| 5,198,846 | 3/1993 | Zilber | 353/DIG. 5 |
| 5,321,451 | 6/1994 | Olugboji | 353/120 |

*Primary Examiner*—William Dowling
*Attorney, Agent, or Firm*—Charles I. Brodsky

[57] ABSTRACT

The transparency presentation organizer of the invention is in the nature of a portfolio binder, including left, middle and right sections foldable one with respect to another to open and placed on top of an overhead projector in displaying transparencies placed atop its middle section, composed of a rigid material transparent to projected light, and dimensioned to accept transparencies of 8½"×11", 8½"×14" and 11"×17" and to close in storing such transparencies and enabling the organizer to be carried about under one's arm or placed within a briefcase carried in one's hand.

18 Claims, 5 Drawing Sheets

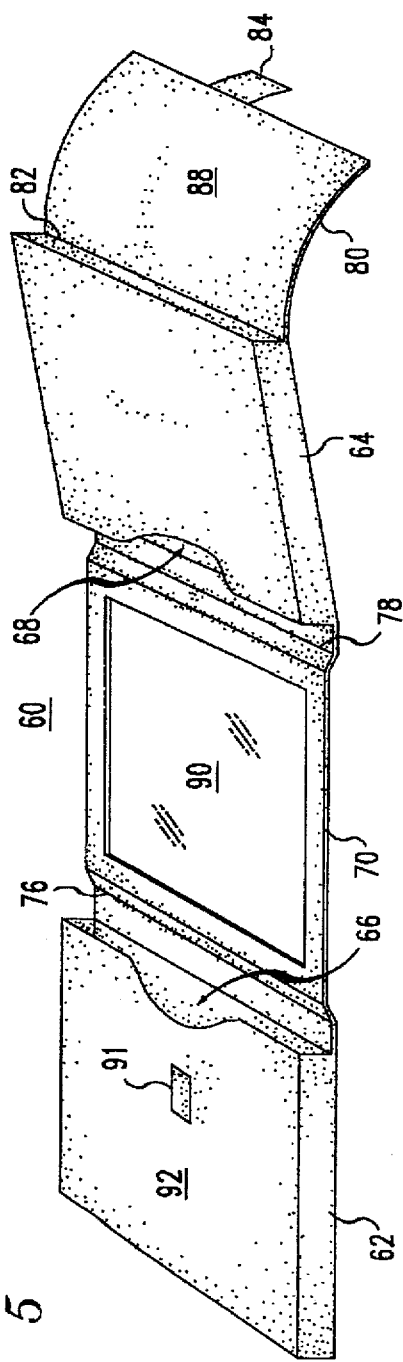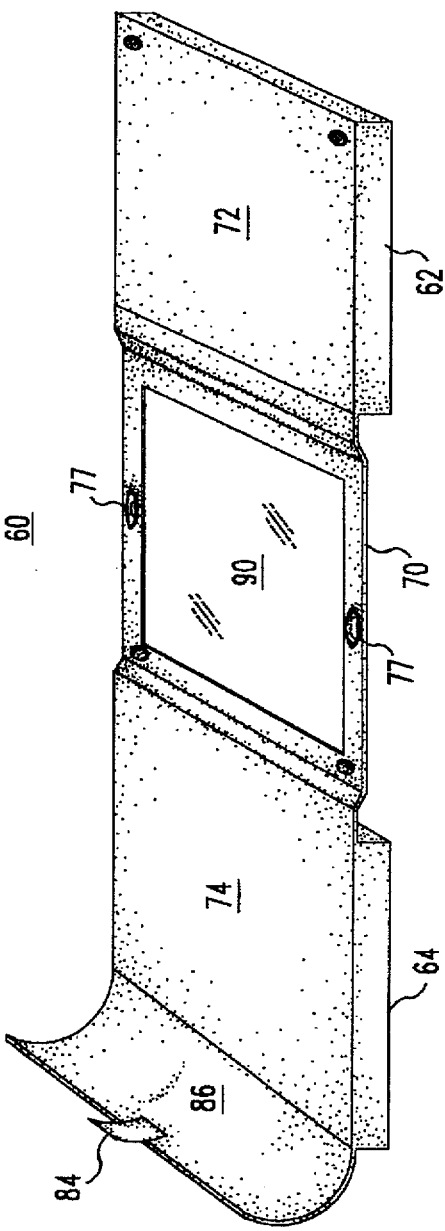
FIG. 5
FIG. 6

TRANSPARENCY PRESENTATION ORGANIZER FOR OVERHEAD PROJECTORS

FIELD OF THE INVENTION

This invention relates to overhead projectors and, more particularly, to a portfolio binder for organizing transparencies as are typically displayed at conferences, seminars, and meetings whether in auditorium or classroom setting.

BACKGROUND OF THE INVENTION

As is well known and understood, in such environments, the overhead projector usually occupies the center of a stage area, with the speaker standing alongside of a small table upon which the projector rests. One by one, in turn, the transparencies to be displayed are then placed by the speaker over the glass stage for projection onto whatever size screen is employed, with the speaker moving the transparency up or down, or from side-to-side, to center and orient the display on the screen.

In usual fashion, the speaker stands alongside the projector holding the transparencies to be displayed in one hand, or in a folder, as the projector most often occupies the entire area of the support table with little or no space remaining on which to place the transparencies which have been or are yet to be displayed. As one by one the transparencies are placed on the glare-free glass stage for display, they are then removed and either placed in a separate folder, just held in the speaker's other hand, or oftentimes just lain on the floor. As will be appreciated, by the experienced conference attendee, a typical presentation often requires the speaker to shift between new transparencies that have yet to be displayed, and others that had previously been shown to the audience. Quite frequently, this results in fumbling back-and-forth, as no useful arrangement exists to properly store in differentiating manner one set of transparencies from the other. As the experienced presenter of these transparencies would appreciate, the process of selecting one transparency for showing, centering it on the glass stage, removing it after the discussion has followed, placing it a new pile is at best cumbersome—and at the worst, is archaic and disruptive. While setting up one side-chair alongside the overhead projector for resting transparencies yet to be shown, and another side-chair on the other side of the projector for resting transparencies that have been shown; may seem to alleviate the problem, at best that does not give a very professional appearance, and suffers the further disadvantage that the projector fan usually is powerful enough to blow the transparencies off of both chairs (or off other space that may be available) and onto the floor, where they again get mixed up.

OBJECTS OF THE INVENTION

It is an object of the present invention, therefore, to provide a transparency presentation organizer for use on overhead projectors which overcomes the problems associated with this prior art.

It is another object of the invention to provide such a transparency presentation organizer which permits easy and simplified display of transparencies on an overhead projector for any size screen—and for transparencies of size 8½"×11", 8½"×14" and 11"×17" or other commercially available or custom sizes by simple modification of the size of the organizer employed.

It is a further object of the invention to provide such a transparency presentation organizer which can secure transparencies and be carried about by the speaker under his, or her arm, and which can be placed within a briefcase for carrying about in his, or her, hand.

It is also an object of the invention to provide such a transparency presentation organizer which stores the transparencies in a manner that they can be reviewed conveniently and without difficulty by the speaker before the presentation begins, as a means of preparing oneself for the presentation that follows.

SUMMARY OF THE INVENTION

As will be seen from the description that follows, the transparency presentation organizer of the invention is in the nature of a portfolio binder, including left, middle and right sections foldable one with respect to another to open in displaying transparencies placed atop the middle section, composed of a rigid material transparent to projected light, and to close in storing such transparencies and enabling the organizer to then be carried about by the presenter. As will be described, in one embodiment of the invention, first and second fold-lines join the left and middle sections together, and join the middle and right sections together—and over which ring binders are overlain into which the transparencies are placed. In such embodiment, transparencies yet to be displayed are maintained in one ring binder, and then simply placed one-by-one onto the middle section which is fitted onto the glare-free stage of the projector. Once the transparency is flashed on the screen, and discussed, it is simply then removed from the middle section by the speaker, and placed in turn into the second ring binder, wherein the process then continues sequentially with the next transparency to be displayed placed onto the middle section, and thereafter removed, and then stacked on top the first transparency in the second binder for further storage. As will be appreciated, when an already displayed transparency needs to be discussed once again, it is merely located on the second ring binder and placed onto the transparent rigid middle section of the portfolio binder, preferably of a plexiglass composition. As will also be seen, in a second embodiment of the invention, in place of the rings, a storage pocket is secured on, or is incorporated into, the inside of the left and right sections of the portfolio binder, with the transparency removed from one pocket, and to be placed into the other, after it is oriented on the transparent middle section for display, which, once again, is placed atop the glare-free stage of the overhead projector. With the middle section similarly of plexiglass, once the presentation has been completed, the left and right sections can be folded one atop the other with respect to the middle section to close the portfolio in enabling it to be carried about.

As will also become clear from the description that follows, arrangements are incorporated with both embodiments to further secure the portfolio after closure, as by means of any acceptable arrangement—whether using hook-and-eye type adhesives, clasps, or other like openable fasteners. For projectors having glass stages of size comparable to that selected for the middle section plexiglass or similar transparent material, the left and right sections of the portfolio simply fold over the glass stage, and hang downwardly towards the floor—where, if desired, various suction or adhesive devices can be employed on the middle section to temporarily adhere the portfolio binder to the top of the overhead projector.

BRIEF DESCRIPTION OF THE DRAWINGS

These and other features of the present invention will be more clearly understood from a consideration of the following description, taken in connection with the accompanying drawings, in which:

FIG. 5 is a top view of a second embodiment of a transparency presentation organizer embodying the invention opened for displaying transparencies on an overhead projector;

FIG. 6 is a bottom view of the embodiment of FIG. 5 when opened for displaying transparencies;

DETAILED DESCRIPTION OF THE DRAWINGS

Figure 1:
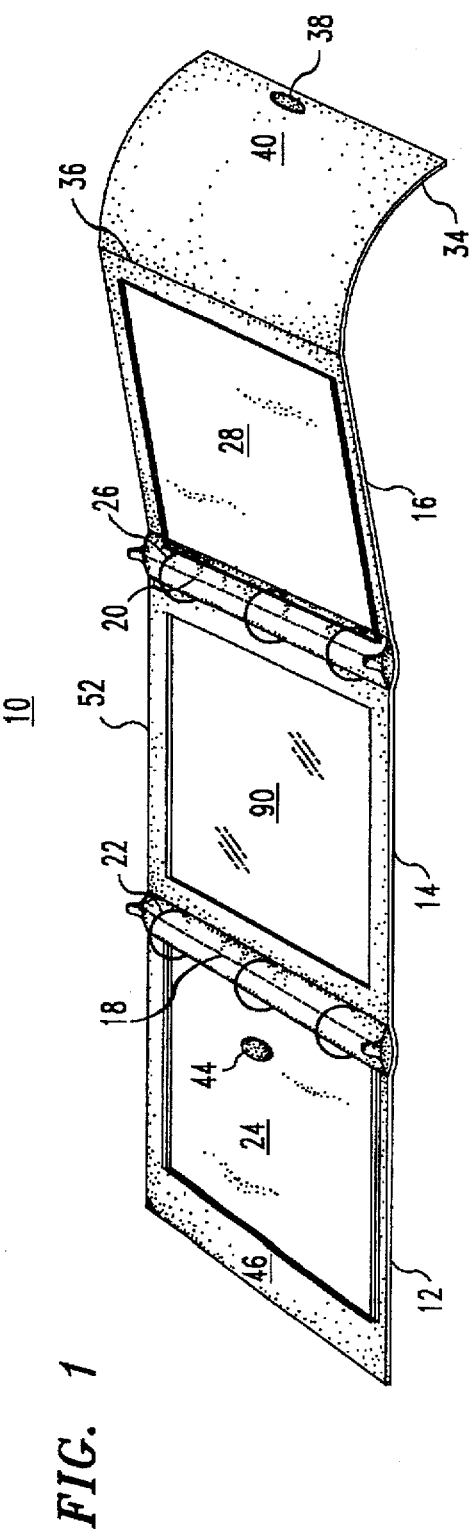
FIG. 1 is a top view of one embodiment of the transparency presentation organizer of the invention, opened for displaying transparencies on an overhead projector.
Figure 2:
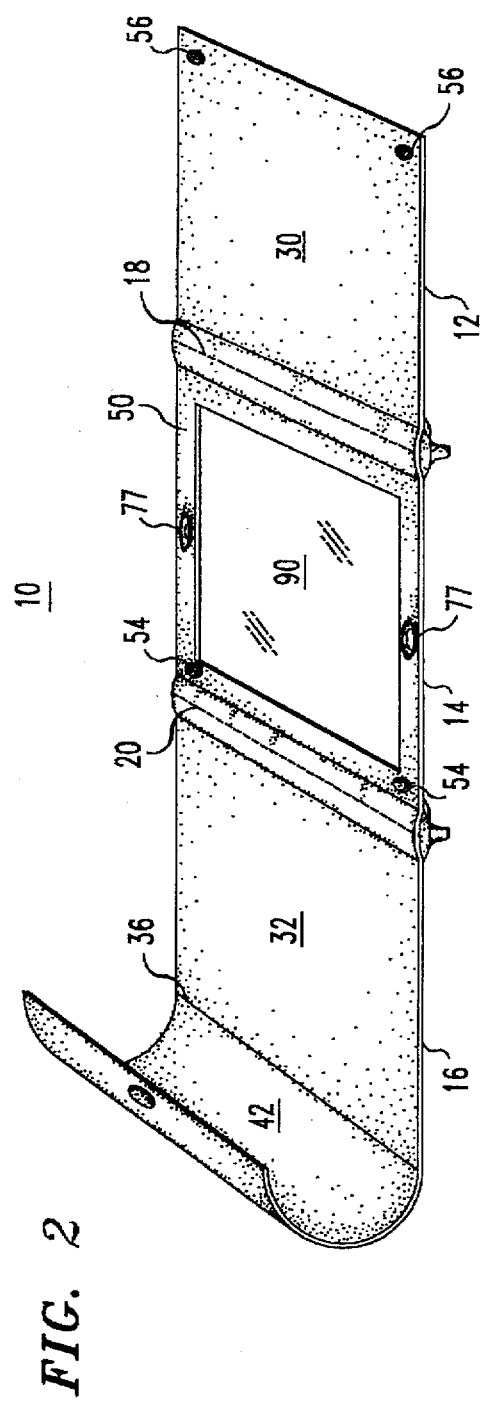
FIG. 2 is a bottom view of the embodiment of FIG. 1 when opened for displaying transparencies.

In FIGS. 1-4, the portfolio binder constituting the transparency presentation organizer of the invention is shown by the reference numeral 10 of a 1-piece unitary construction having left 12, middle 14 and right 16 sections respectively. A first fold-line 18 joins together the left and middle sections 12, 14 while a second fold-line 20 joins together the middle and right sections 14, 16 respectively. Overlying the first fold-line 18 is a first ring binder 22 in which transparencies 24 to be displayed sequentially are inserted, with the first transparency to be displayed positioned on top, and proceeding down to the last transparency to be displayed located on the bottom. Overlying the second fold-line 20 is a second ring binder 26 into which the transparencies 24 are inserted after they have been displayed, with the first such transparency then being positioned at the bottom, and with successively displayed transparencies being inserted into the second ring binder 26 one, atop the other, until the last transparency is displayed, and inserted at the top of the transparencies in the second ring binder, shown by the reference notation 28.

In accordance with the invention, the left and right sections of the portfolio 12, 16 may be constructed of any rigid material, as the binders of a loose-leaf folder, for example. In accordance with the invention, on the other hand, the middle section 14 is composed of a rigid material, transparent, as at 90, to projected light, and constructed of a plexiglass fabrication, for example. In accordance with the usage of the invention, the middle section 14 is placed over the glare-free glass stage of the overhead projector, through which the lamp illumination is directed. Removing in turn each transparency 24 from ring binder 22 and placing it directly in the light path for projection on the screen displays the information on the transparency—whether it be a chart, a graph, a drawing, or any other type of information content.

Figure 3:
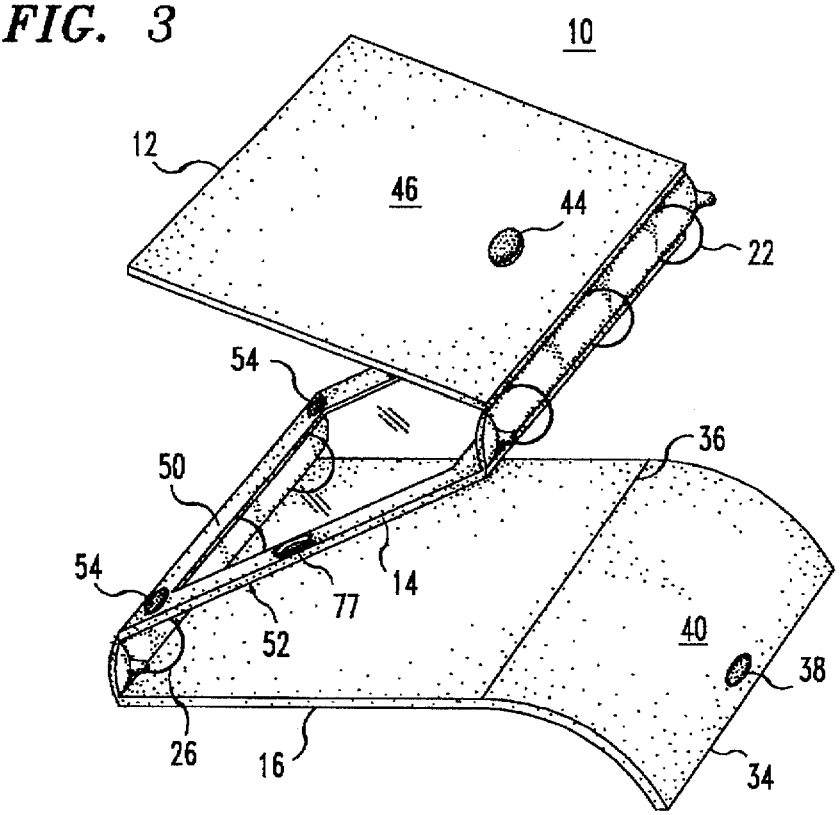
FIG. 3 is a view helpful in understanding how the embodiments of FIGS. 1 and 2 may be closed after a presentation has been completed.
Figure 4:
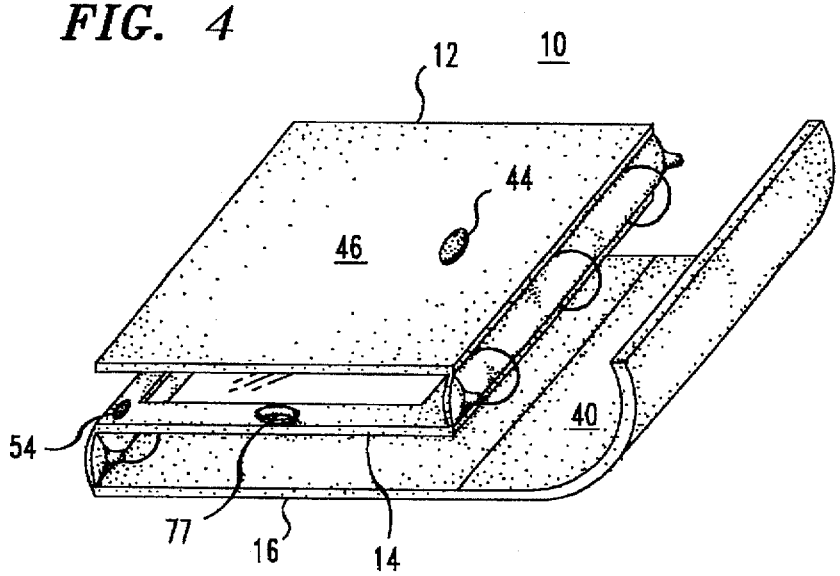
FIG. 4 shows the embodiments of FIGS. 1 and 2 closed, and ready for carrying about.
Figure 9:
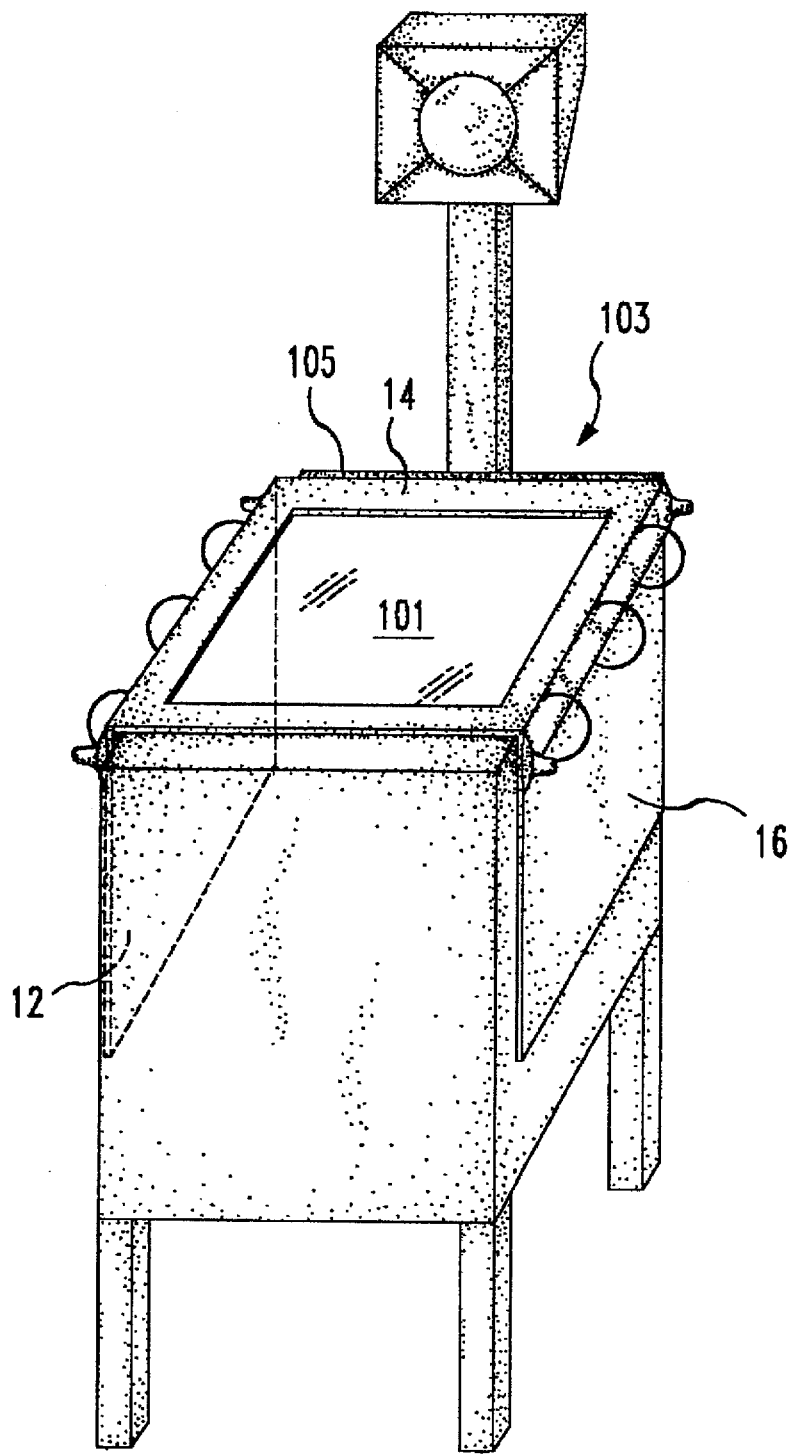
FIG. 9 is a simplified view of an overhead projector with the transparent presentation organizer of FIGS. 1-4 in place for displaying transparencies.

In accordance with the invention as shown in FIGS. 1-4, the left section 12, the first fold-line 18 and the first ring binder 22 are positioned such that the left section 12 is able to be folded downwardly, and over the middle section 14, as shown in FIGS. 3 and 4. The right section 16, the second fold-line 20 and the second ring binder 26 are positioned in this embodiment to permit the right section 16 to be folded upwardly and under the middle section 14 in closing the portfolio 10 (FIGS. 3 and 4). At the same time, the second fold-line 20 and the second ring binder 26 are positioned to allow the right section 16 to rotate downwardly, for use where the middle section 14 is placed over the projector's glass stage 101, with the left section 12 and the right section 16 then hanging downwardly about the sides of the projector 103 (FIG. 9). In such situation, the bottom side 50 of the middle section 14, may be provided with any type of attachment 77 (suction cup or otherwise) as would temporarily hold section 14 to the glass stage 105 of the projector 103, assuring the binder will remain stationery. With the area 90 in the middle section 14 being dimensioned to accept 8½"×11", 8½"×14" and 11"×17" transparencies, the portfolio binder 10 can be lain over the glass stage of comparably sized projector in displaying the transparencies, either vertically (as shown in FIGS. 1-4 and 5-8), or horizontally, simply by turning the portfolio binders 10 of these FIGS. 90°.

(As will be appreciated by those skilled in the art, the transparencies to be displayed may be initially maintained in the second ring binder 26 on the right section 16, and then sequentially placed to overlay the middle section 14, and to be then inserted into the first ring binder 22 after presentation, so that the sequence of putting the transparencies in place can proceed either from left-to-right in FIGS. 1-4, or from right-to-left. As will be understood, the same sequencing, i.e., from left-to-right, or from right-to-left, will be seen to follow with the embodiments of FIGS. 5-8.)

Also shown in FIGS. 1-4 is a further section 34, and third fold-line 36 joining together the right section 16 and the further section 34 while permitting the further section 34 to be folded over the right section 16. In particular, and utilized in fastening the portfolio binder 10 for storage after the transparency presentation has been completed, one part 38 of a two-part fastening device is included on the top side 40 of the further section 34, which also has a bottom side 42. At the same time, the second part 44 of the two-part fastener is positioned on the top side 46 of the left section 12, the bottom side of which is shown at 30. When the left section 12 is rotated about the first fold-line 18 over the middle section 14 (FIG. 3) and the middle section 14 rotated atop the right section 16, rotating the further section 34 about the fold-line 36 will be seen to then place the two parts 38 and 44 into position for closing the portfolio binder 10 into the configuration shown in FIG. 4. Such two parts 38 and 44 may comprise a hook-and-tie adhesive, a clasp arrangement, a snap closure, or any other available type of fastener. To further secure the closure, the bottom side 50 of the middle section 14, having a top side 52, is similarly provided with one part 54 of a two-part fastener, the second part of which 56 may be located on the bottom side 30 of the left section 12. When the further section 34 is thus rotated over the fold-line 36 to join the fastener parts 38 and 44, the appearance of FIG. 4 thus results, enabling the closed binder to secure the transparencies and then be carried about simply and easily by the speaker, and can be packed in a briefcase or attache case for further use. As will be apparent, reversing the process separates the component parts 38 and 44, on the one hand, and 54 and 56, on the other hand, to allow the speaker to thereafter review the transparencies stored in either the first 22 or second 26 binders, prior to making the next presentation, or rearranging their order, or replacing and/or adding further transparencies for overhead projector display.

Figure 7:
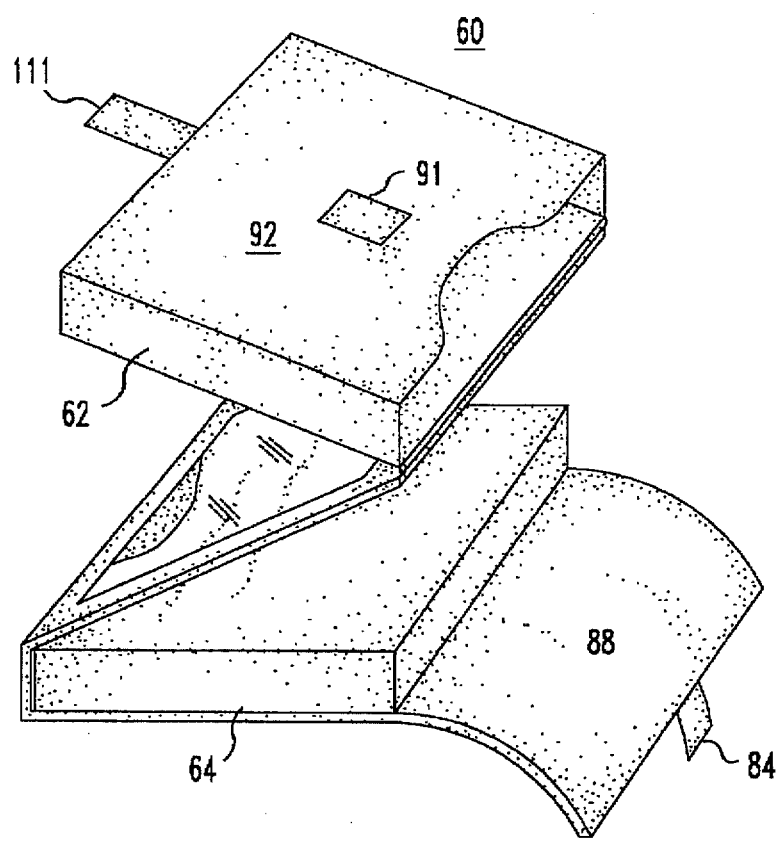
FIG. 7 is a view helpful in understanding the manner of closing the transparency presentation organizer of FIGS. 5 and 6 after a presentation has been completed.
Figure 8:
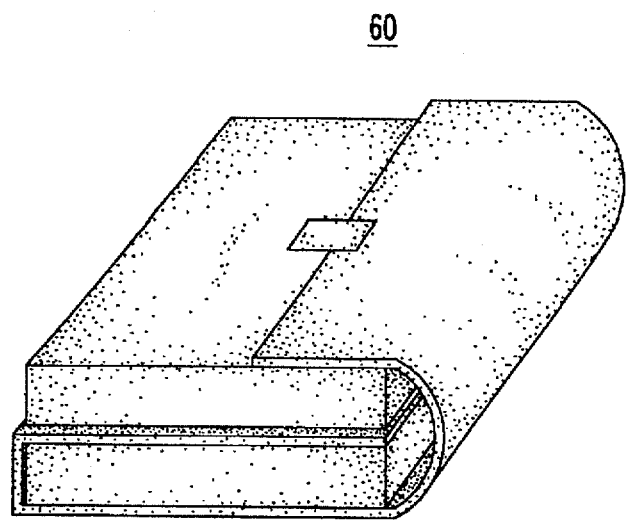
FIG. 8 illustrates the embodiment of the invention of FIGS. 5 and 6 closed and secured for carrying about either under a speaker's arm, or to be placed within a briefcase for carrying about in the speaker's hand.

In FIGS. 5–8, on the other hand, a second portfolio binder embodiment 60 is shown. Like that of FIGS. 1–4, the left and right sections 62, 64, respectively, can be used to store transparencies yet to be displayed, and others already displayed as the situation arises. In the embodiments of FIGS. 5–8, however, instead of employing ring binders (as 22, 26), a pair of storage pockets 66, 68 are utilized. Transparencies kept in one of the pockets can then be removed, displayed, and then placed in the other pocket for storage, either from left-to-right as shown in FIGS. 5–6, or from right-to-left. The middle section of the binder 60 is shown at 70—and as with the embodiment of the invention in FIGS. 1–4, is composed of a rigid material transparent, as at 90, to projected light, as with plexiglass. Also of available 8½"× 11", 8½"×14" and/or 11"×17" dimension, the area 90 of the middle section 70 also can be placed atop the glass stage 101 of the overhead projector 103, with the sections 62, 64 hanging downwardly, with suction cups or other fasteners 77 on the outer side 70 of the section 90, to temporarily adhere to the glass stage of the overhead projector. The first fold-line which joins together the left section 62 and the middle section 70 is shown at 76, while the second fold-line which joins together the middle section 70 and right section 64 is shown at 78. The further section used in fastening the portfolio binder 60 closed is shown at 80, joined to the right section 64 by the third fold-line 82. Whereas a similar type of two-part component system can be utilized with the embodiment of FIGS. 5–8 (namely, the components 38, 44 and 54, 56), an alternative fastening arrangement is shown in FIGS. 5–8, wherein one part 84 of a two-part component system is shown connected to the bottom side 86 of the further section 80 (its top side being shown at 88), with the second part 91 of the two-part component system included on the top side 92 of the left section 62, its bottom side being shown at 72. In such configuration, the two-part component system simply may comprise a peelable tape, one end of which is secured to the bottom side 86, and the other part removably taped to the top side 92 of the section 62. Additionally, and as shown in FIG. 7, the top side 92 of section 62 may include an adhesive device 111 (also in the form of a peelable tape, for example) to be secured at an underside of the section 64. As with the embodiment of FIGS. 1–4, the embodiment of FIGS. 5–8 can be closed in the manner shown in FIG. 7 to arrive at the completely closed arrangement of FIG. 8, to be thereafter carried about and/or stored. In constructing this embodiment, so that the portfolio binder organizer 60 closes smoothly, each of the pockets 66, 68 should preferably extend to a location short of their respective fold-lines 76, 78.

While there have been described what are considered to be preferred embodiments of the presentation organizer of the present invention, it will be appreciated by those skilled in the art that modifications can be made without departing from the scope of the teachings herein. Thus, whereas plexiglass has been set out as a preferred material for the area 90 of the middle section 14 or 70, other types of rigid materials, transparent to projected light may be used instead. While less rigid materials as Cellophane constructions might be thought to be utilizable instead, experience has shown that such usage does not present a professional appearance for the organizer of the invention, or one that will stand up under repeated use, storage and carrying about. Similarly, whereas ring binders have been described for receiving and storing the transparencies on the one hand, and storage pockets described on the other hand, alternative types of binding arrangements and storage arrangements may be utilized instead, and still carrying through the concept of the invention of having an openable and collapsible portfolio binder in which the transparencies are kept, selectively removed, and then reinserted—all the while with a transparent rigid middle section to seat atop the glare-free glass stage of the overhead projector in displaying on whatever size screen is employed that transparency which is illuminated by the light from the projector lamp. For all the foregoing reasons, resort should be had to the claims appended hereto for a true understanding of the scope of the invention.

I claim:

1. A transparency presentation organizer for overhead projectors comprising:

a 1-piece portfolio binder having left, middle, and right sections;

a first fold-line joining said left and said middle sections together for permitting said left section to be folded under said middle section at a first predetermined location;

a second fold-line joining said middle and said right sections together for permitting said right section to be folded over said middle section at a second predetermined location;

means for storing transparencies for an overhead projector in both of said left and right sections; and with said middle section being composed of a rigid material transparent to projected light.

2. The transparency presentation organizer of claim 1 wherein said means includes a first ring binder overlying said first fold-line.

3. The transparency presentation organizer of claim 1 wherein said means includes a first ring binder overlying said second fold-line.

4. The transparency presentation organizer of claim 1 wherein said means includes a first ring binder overlying said first fold-line and a second ring binder overlying said second fold-line.

5. The transparency presentation organizer of claim 4 wherein said middle section is composed of plexiglass.

6. The transparency presentation organizer of claim 1 wherein said means includes a first storage pocket overlying said left section extending to a location not exceeding said first predetermined location of said first fold-line.

7. The transparency presentation organizer of claim 1 wherein said means includes a first storage pocket overlying said right section extending to a location not exceeding the location of said second predetermined location of said second fold-line.

8. The transparency presentation organizer of claim 1 wherein said means includes a first storage pocket overlying said left section extending to a location not exceeding said first predetermined location of said first fold-line and a second storage pocket overlying said right section extending to a location not exceeding said second predetermined location of said second fold-line.

9. The transparency presentation organizer of claim 8 wherein said middle section is composed of plexiglass.

10. The transparency presentation organizer of claim 1 wherein there is also included a fourth section, and a third fold-line joining said fourth section and said right section together for permitting said fourth section to be folded over said right section.

11. The transparency presentation organizer of claim 10 wherein said left section includes a top side and a bottom side, wherein said fourth section includes a top side and a bottom side, and wherein means are included on said top side of said left section and on said top side of said fourth section in fastening said transparency presentation organizer when said left section is folded about said first fold-line over said middle section, when said right section is folded about said second fold-line under said middle section, and when said fourth section is folded about said third fold-line over said left section in said order.

12. The transparency presentation organizer of claim 11 wherein said middle section includes a top side and a bottom side, and wherein means are further included on said bottom side of said left section and on said bottom side of said middle section in fastening said transparency presentation organizer when said left section is folded about said first fold-line over said middle section.

13. The transparency presentation organizer of claim 12 wherein said middle section is composed of plexiglass.

14. The transparency presentation organizer of claim 10 wherein said middle section includes a top side and a bottom side, wherein said further section includes a top side and a bottom side, and wherein means are included on said bottom side of said middle section and on said bottom side of said further section in fastening said transparency presentation organizer when said left section is folded about said first fold-line over said middle section, when said right section is folded about said second fold-line under said middle section, and when said further section is folded about said third line over said left section in said order.

15. The transparency presentation organizer of claim 14 wherein said middle section is composed of plexiglass.

16. The transparency presentation organizer of claim 1 wherein said middle section is of a dimension to accept transparencies of size 8½"×11", 8½"×14" and 11"×17".

17. The transparency presentation organizer of claim 1, also including means on said middle section for temporarily securing said middle section to said overhead projector.

18. The transparency presentation organizer of claim 17 wherein said means comprise a pair of suction cups.

* * * * *